US010489333B2

(12) United States Patent
Dipert et al.

(10) Patent No.: US 10,489,333 B2
(45) Date of Patent: Nov. 26, 2019

(54) ELECTRICALLY CONFIGURABLE OPTION BOARD INTERFACE

(71) Applicant: Zebra Technologies Corporation, Lincolnshire, IL (US)

(72) Inventors: Dwight David Dipert, Barrington, IL (US); Brad Mathis, McHenry, IL (US); Ashok K. Charles, Lombard, IL (US); David Scott Schmitt, Bolingbrook, IL (US); Michael Cranston, Carpentersville, IL (US)

(73) Assignee: Zebra Technologies Corporation, Lincolnshire, IL (US)

(*) Notice: Subject to any disclaimer, the term of this patent is extended or adjusted under 35 U.S.C. 154(b) by 57 days.

(21) Appl. No.: 13/773,161

(22) Filed: Feb. 21, 2013

(65) Prior Publication Data
US 2013/0219093 A1 Aug. 22, 2013

Related U.S. Application Data

(60) Provisional application No. 61/601,408, filed on Feb. 21, 2012.

(51) Int. Cl.
*G06F 13/40* (2006.01)

(52) U.S. Cl.
CPC ...... *G06F 13/4072* (2013.01); *G06F 13/4068* (2013.01)

(58) Field of Classification Search
USPC .......... 710/11, 12, 62, 63, 64, 305, 313, 315
See application file for complete search history.

(56) References Cited

U.S. PATENT DOCUMENTS

| 4,500,933 A | * | 2/1985 | Chan ........................... 360/69 |
| 4,930,915 A | | 6/1990 | Kikuchi |
| 5,534,801 A | * | 7/1996 | Wu et al. ................... 327/72 |

(Continued)

FOREIGN PATENT DOCUMENTS

| CN | 1283818 A | 2/2001 |
| EP | 0751003 A1 | 1/1997 |

(Continued)

OTHER PUBLICATIONS

PCI Express Base Specification Revision 3.0 Nov. 10, 2010 (Year: 2010).*

(Continued)

*Primary Examiner* — Paul R. Myers

(57) ABSTRACT

A Main Logic Board having an electrically configurable option board interface (ECOBI) to facilitate connection of option boards into apparatus for providing optional functions. Once connected to the host, an Option board provides identification (ID) data to the main logic board host processor. The host processor determines the interface configuration necessary to enable communication between the host and the option board based on the option board ID, then configures electrically configurable interface circuitry for operational compatibility. The option board may provide an interface driver directly to the host for configuration of the interface. The interface may comprise a standard interface protocol such as PCI or USB that the host configures through the same connection to the option board.

24 Claims, 6 Drawing Sheets

(56) References Cited

U.S. PATENT DOCUMENTS

| | | | |
|---|---|---|---|
| 5,736,997 A | 4/1998 | Bolash | |
| 5,781,744 A * | 7/1998 | Johnson | G06F 13/4081 710/15 |
| 5,809,329 A * | 9/1998 | Lichtman et al. | 710/8 |
| 5,909,596 A * | 6/1999 | Mizuta | G06F 13/4081 710/104 |
| 5,951,684 A * | 9/1999 | Jeon | G06F 9/4411 713/1 |
| 6,003,097 A * | 12/1999 | Richman | G06F 9/4411 710/11 |
| 6,012,143 A * | 1/2000 | Tanaka | 726/20 |
| 6,044,423 A * | 3/2000 | Seo | G06F 9/4411 710/10 |
| 6,058,445 A * | 5/2000 | Chari | G06F 9/4411 709/223 |
| 6,163,825 A * | 12/2000 | Wallach | G06F 1/20 710/302 |
| 6,470,284 B1 | 10/2002 | Oh et al. | |
| 6,505,258 B1 * | 1/2003 | Sakarda | G06F 1/1632 710/109 |
| 6,550,060 B1 * | 4/2003 | Hammond | G06F 9/44521 717/162 |
| 6,572,384 B1 * | 6/2003 | Marchevsky | 439/43 |
| 6,658,497 B1 * | 12/2003 | Kawasaki et al. | 710/8 |
| 6,671,748 B1 * | 12/2003 | Cole et al. | 710/8 |
| 6,895,447 B2 * | 5/2005 | Brewer et al. | 710/11 |
| 6,941,543 B1 * | 9/2005 | Brown | G05B 19/416 700/28 |
| 7,080,164 B2 * | 7/2006 | Jacobs et al. | 710/8 |
| 7,209,987 B1 * | 4/2007 | Schneider | G06F 13/409 326/101 |
| 7,346,717 B2 * | 3/2008 | Isemura | G06K 15/00 358/1.15 |
| 7,433,983 B2 * | 10/2008 | Lu | 710/104 |
| 7,711,870 B2 * | 5/2010 | Yoshida | G06F 13/4295 326/62 |
| 7,738,137 B2 | 6/2010 | Graf | |
| 7,836,236 B2 * | 11/2010 | Chou | G06F 13/385 710/11 |
| 7,836,238 B2 * | 11/2010 | Freimuth | G06F 13/4022 710/16 |
| 8,103,993 B2 * | 1/2012 | Atherton | G06F 13/4022 716/100 |
| 8,140,730 B2 * | 3/2012 | Atherton | G06F 13/4295 710/301 |
| 8,161,200 B2 * | 4/2012 | Kostadinov | 710/11 |
| 8,275,914 B2 * | 9/2012 | Kim | G06F 13/4081 710/15 |
| 8,433,839 B2 * | 4/2013 | Sun | H05K 1/029 710/301 |
| 8,484,387 B2 * | 7/2013 | Kim | G06F 13/4072 710/11 |
| 8,683,087 B2 * | 3/2014 | Connolly | G06F 13/387 710/11 |
| 9,333,781 B2 | 5/2016 | Qu et al. | |
| 2001/0048451 A1 | 12/2001 | Saul | |
| 2002/0111771 A1 | 8/2002 | Huang et al. | |
| 2003/0093598 A1 * | 5/2003 | Park | H04M 1/72527 710/63 |
| 2003/0188067 A1 | 10/2003 | Okin | |
| 2003/0229748 A1 * | 12/2003 | Brewer et al. | 710/305 |
| 2005/0086434 A1 * | 4/2005 | Kang | G06K 19/07309 711/115 |
| 2005/0102454 A1 * | 5/2005 | McAfee | G06F 13/4022 710/107 |
| 2006/0106514 A1 | 5/2006 | Liebl et al. | |
| 2007/0233926 A1 * | 10/2007 | Chang | G06F 13/4018 710/301 |
| 2007/0276981 A1 * | 11/2007 | Atherton | G06F 13/4022 710/307 |
| 2008/0244147 A1 * | 10/2008 | Chen | 710/313 |
| 2009/0006708 A1 * | 1/2009 | Lim | G06F 13/4022 710/314 |
| 2009/0063741 A1 * | 3/2009 | Lu | G06F 13/409 710/301 |
| 2010/0100657 A1 | 4/2010 | Ji et al. | |
| 2011/0276724 A1 * | 11/2011 | Mullis et al. | 710/8 |
| 2011/0294359 A1 * | 12/2011 | Cho | H01R 27/00 439/676 |
| 2012/0102238 A1 * | 4/2012 | Wei | G06F 13/102 710/13 |
| 2012/0250204 A1 * | 10/2012 | Wada | H02H 3/207 361/86 |
| 2012/0280723 A1 * | 11/2012 | Scott et al. | 327/108 |
| 2014/0244992 A1 * | 8/2014 | Wang | G06F 9/4411 713/2 |

FOREIGN PATENT DOCUMENTS

| | | |
|---|---|---|
| EP | 1661711 A1 | 5/2006 |
| EP | 2133209 A2 | 12/2009 |
| FR | 2915130 A1 | 10/2008 |
| WO | 2014/059896 A1 | 4/2014 |

OTHER PUBLICATIONS

International Search Report and Written Opinion for Application No. PCT/US2013/027102 dated May 13, 2013.

"Communication pursuant to Article 94(3) EPC," issued by European Patent Office dated Sep. 25, 2015 in connection with EP Patent Application No. 13710142.4.

U.S. Appl. No. 14/670,969, filed Mar. 27, 2015.

United States Patent and Trademark Office, "Notice of Allowance," issued in connection with U.S. Appl. No. 14/670,969 dated Oct. 24, 2016.

International Search Report and Written Opinion issued in connection with International Patent Application No. PCT/US2016/021487 dated Jun. 22, 2016.

United States Patent and Trademark Office, "Office Action," issued in connection with U.S. Appl. No. 14/670,969 dated Dec. 21, 2015.

Office action issued in connection with Chinese Patent Application No. 20138008772.3 dated Mar. 2, 2016.

\* cited by examiner

ELECTRICALLY CONFIGURABLE OPTION BOARD INTERFACE

TECHNOLOGICAL FIELD

The present invention relates to the field of electrical and electronic design, more particularly to an electrically configurable interface for a host that can be configured in hardware and/or software to accommodate various interfaces presented on option boards connected to the host.

BACKGROUND

Option boards for augmenting functionality in systems are normally constrained to a fixed electrical interface, either dictated by the particular components used or by a particular electrical standard designed by the IEEE (e.g., Peripheral Component Interconnect—PCI) or other standards body. These constrain not only the electrical voltage levels, signaling formats, and software protocols that may be used across the interface, but also the exact type of components utilized in connection with it. Systems would gain more flexibility if option boards could be incorporated into systems that were able to adapt the interface between the system and the option board regardless of the interface configuration of the option board. Systems would be able to accommodate future developments in available options without redesigning the system interface every time a new option board became available with desirable functionality.

BRIEF SUMMARY

In a first embodiment, a method is described that comprises receiving option board identification data, determining option board interface configuration from the board identification data, configuring host interface circuitry for option board communication; and initializing the option board. The method may further comprise selecting one of a predefined and a configurable input/output based on the option board identification data, selecting active signal lines to the option board and defining inputs and outputs in the configured interface. Configuring the interface may further comprise selecting pullups and pulldowns for each signal line, selecting a drive strength for each output, selecting the driver/receiver type for compatibility through the interface, selecting a synchronization protocol for the interface configuration, and selecting switching thresholds for the signal lines. The method includes the option board identification being received through a dedicated interface bus and the host interface is configured by the driver operating in the host processor. The method may further comprise querying the option board for its identification data and determining that the received option board identification (ID) is a valid ID.

An alternative embodiment may be a computer program product comprising a computer readable storage medium having computer coded instructions stored therein, said instructions when executed by a processor causing an apparatus to perform receiving option board identification data, determining option board interface configuration from the board identification data, configuring host interface circuitry for option board communication, and initializing the option board. The program product may further comprise instructions that cause the apparatus to perform selecting active signal lines to the option board, defining inputs and outputs in the configured interface, wherein the option board identification is received through a dedicated interface bus, and wherein an interface driver for the option board is received through the dedicated interface bus and the host interface is configured by the driver operating in the host processor. The program product may further comprise instructions for querying the option board for its identification data, and determining that the received option board identification (ID) is a valid ID.

Another embodiment may be an apparatus comprising at least a host logic assembly comprising a processor, a memory in communication with the processor having computer coded instructions stored therein, and electrically configurable interface circuitry; and an option board connected to the host assembly, said instructions when executed by the processor causing the apparatus to perform, receiving option board identification data, determining option board interface configuration from the board identification data, configuring host interface circuitry for option board communication, and initializing the option board. The apparatus may comprise instructions for querying the option board for its identification data, determining that the received option board identification (ID) is a valid ID, selecting one of a predefined and a configurable input/output based on the option board identification data, and configuring the electrically configurable interface after hot-swapping one option board for another.

BRIEF DESCRIPTION OF THE DRAWING(S)

Having thus described various embodiments in general terms, reference will now be made to the accompanying drawings, which are not necessarily drawn to scale, and wherein:

DETAILED DESCRIPTION

Various embodiments now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
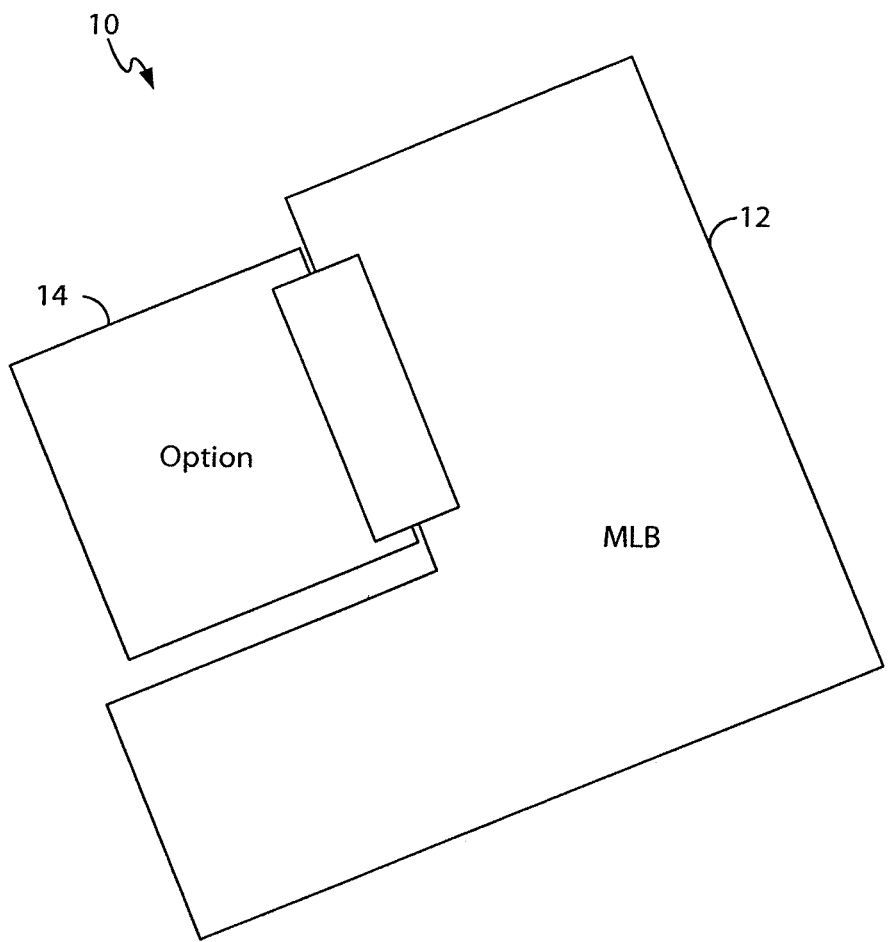
FIG. 1 is a schematic drawing of a basic host and option board assembly.

Referring to FIG. 1, many electronic designs 10 can be represented in their basic form by two schematic elements, a Main Logic Board (MLB) (a "host") 12 and an Option board 14. It is an objective of the present invention to equip the MLB host with a configurable interface such that, despite a wide variety of interface configurations required by the Option board, the board can be connected to the MLB host and function correctly with only an invocation of the host's configuration routine controlling the configurable interface.

(Note: in this description "option" and "option board" are intended to refer to any peripheral device or assembly that interfaces with a host logic assembly.)

Figure 2:
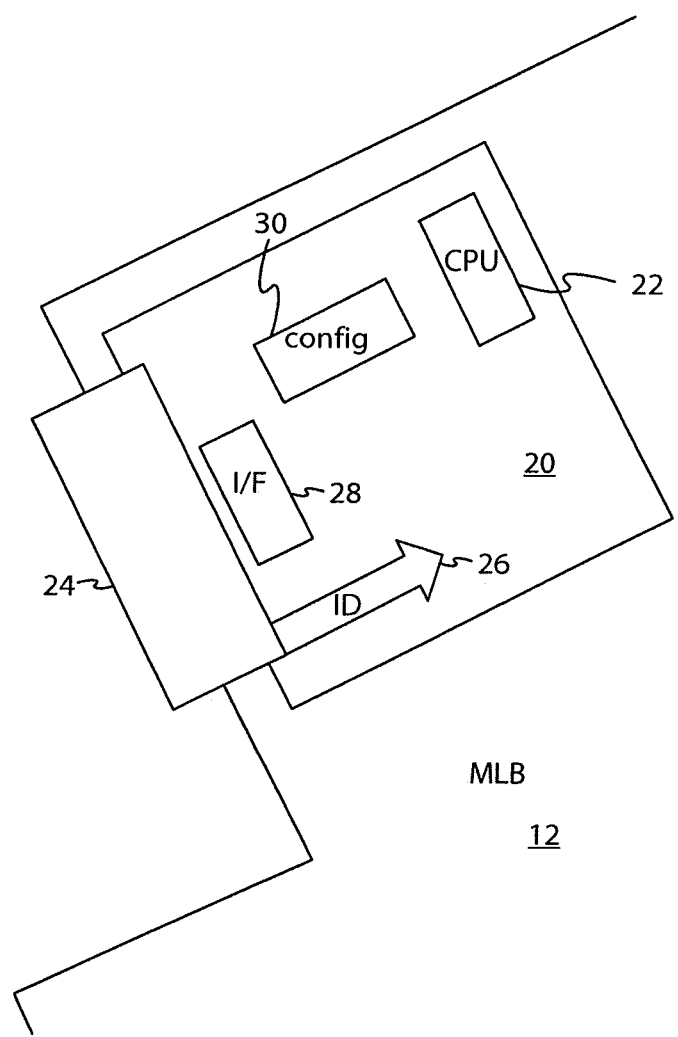
FIG. 2 is a schematic drawing of an electrical assembly comprising an example embodiment of the configurable interface of the invention.

Referring to FIG. 2, in an example embodiment the electrically configurable option board interface (ECOBI) may comprise a host board 20 having at least three elements; a computer processing unit (CPU) 22, an Option board connection interface 24 comprising a connector, and a fixed Option board identification (ID) mechanism 26. To support Option boards having functional electronics that the host board should support, in addition to the ID mechanism, the host comprises flexible electronics interface circuitry 28 enabling the host to communicate electrically with the circuitry on the Option board (not shown). The configurable interface circuitry 28 may comprise a Field Programmable Gate Array (FPGA) together with a configuration method to support field configuration of the FPGA through software. The method may be instructions stored in a memory device 30 that would comprise a new device driver to configure the interface electronic circuitry and a protocol to communicate with the option board according to its standard requirements (e.g., PCI, VME, IEEE-488, STD-32 etc.).

The host board connector 24 should be configured with an electrical connector having a number of contact pins sufficient to accommodate connection to most or all of the interfaces that may be encountered on an option board. The option boards will normally comprise a fixed option board ID mechanism and a standard mating connector that provides the necessary connections to operate it according to its interface protocol. However, any type of connector, or multiple connectors, could be used which provide the essential connections between the host board and the option board. An example 64-pin connector configuration appears in Table 1.

TABLE 1

Option Board Interface Pinout

| Pin | Signal | Signal | Pin |
| --- | --- | --- | --- |
| B1 | GND | GND | A1 |
| B2 | 24 V | 24 V | A2 |
| B3 | 5V_FUSED | 5V_FUSED | A3 |
| B4 | GND | GND | A4 |
| B5 | 5 V (unfused) | 3.3 V | A5 |
| B6 | PCTRLDIR/GPIO | GND | A6 |
| B7 | BOARD_ID1/I2C_SDA | BOARD_ID0/I2C_SCK | A7 |
| B8 | GND | ENET_LED_NLINK | A8 |
| B9 | NPSELECTIN/GPIO | ENET_LED_NSPEED | A9 |
| B10 | NPINIT/GPIO | GND | A10 |
| B11 | NPSTROBE | NPAUTOFD/GPIO | A11 |
| B12 | GND | NPFAULT/GPIO | A12 |
| B13 | PSELECT/GPIO | PERROR/GPIO | A13 |
| B14 | PBUSY | GND | A14 |
| B15 | PD7 | NPACK/GPIO | A15 |
| B16 | GND | PD6 | A16 |
| B17 | PD5 | PD4 | A17 |
| B18 | PD3 | GND | A18 |
| B19 | PD1 | PD2 | A19 |
| B20 | GND | PD0 | A20 |
| B21 | SDIO1_D0/GPIO | SDIO1_CMD/GPIO | A21 |
| B22 | SDIO1_D1/GPIO | GND | A22 |
| B23 | GND | SDIO1_CLK/GPIO | A23 |
| B24 | SDIO1_D2/GPIO | NRESET | A24 |
| B25 | SDIO1_D3/GPIO | GND | A25 |
| B26 | GND | SDIO_PWR_CNTL/GPIO | A26 |
| B27 | USBH_DP | USB_GND | A27 |
| B28 | USBH_DM | USBH_OVRCUR | A28 |
| B29 | GND | GND | A29 |
| B30 | ENET_TXP | ENET_RXP | A30 |

TABLE 1-continued

Option Board Interface Pinout

| Pin | Signal | Signal | Pin |
| --- | --- | --- | --- |
| B31 | ENET_TXN | ENET_RXN | A31 |
| B32 | GND | GND | A32 |

The Table 1 example connector configuration provides both standard and configurable interfaces. Power (pins A2-A3, A5 and B2-B3, B5) and Ground (pins A1, B1; A4; B4; A6; B8; A10; B12; A14; B16; A18; B20; A22; B23; A25; B26; A29, B29; A32, B32) connection pins are allotted. A plurality of standard interfaces are accommodated. A plurality of standard interfaces are accommodated. A USB interface occupies pins A27-28 and B27-28. An Ethernet interface is provided at pins A30-31, B30-B31. A Secure Data Input/Output (SDIO) interface occupies pins A21, B21, B22, A23, A24, B24, B25, A26. A General Purpose Input/Output interface occupies pins B6, B9, B10, A11-A13, B13, B14, A15, B15, A16-A17, B17-B19, A19-A20 and is secondary to the SDIO pins as well.

The ID mechanism that enables an option board to identify itself (and thereby its interface configuration) to the host may operate over a dedicated signal bus. Pins A7, B7 provide the ID signal lines (Board_ID0, Board_ID1) in the example of Table 1. The host MLB board interface may comprise an I2C (inter-integrated circuit) bus, with the primary function of communicating to a device on the option board storing option board ID information. In one embodiment, option board type may have a unique option type ID number that the host processor can use to determine the option type, and determine and configure the communication protocol (parallel, SDIO, etc.) used for that option. The host board ID circuitry may also store other information such as option board serial number, etc. The ID interface is used by the host to obtain the option board ID information and determine which communication interface to use, and how to configure that interface. Because (in the example) pins A7, B7 are used by the MLB to receive data usable to identify the option board and configure the communication interface to the option board type, all option boards must provide the signals for that function on the same pins.

Under another embodiment, an option board serial number or other data related to option type ID could be provided by the option board to the MLB. In this case, the MLB would use a lookup table, query a remote database, or execute software instructions to determine the option type ID and determine and configure the communication protocol used for that option. Under another embodiment, data related to option type ID could be provided by the option board using different pins, mechanical, optical, or wireless means. Under another embodiment, data related to option type ID could be provided to the MLB from a source other than the option board, such as a setting installed during manufacture when it is known which option board type may be installed.

The method for supporting configuration of the flexible interface may comprise one or more of several approaches. An electrical connector 30 may be provided in lieu of a memory device through which an external computer may download the device driver to the CPU 22 that reconfigures the interface 28 circuitry (such as an FPGA) for communication with a new Option board. Alternatively, the method may comprise an electrically programmable read-only memory (EPROM) or simple ROM residing on the connector 30 on which is stored the device driver that reconfigures the interface 28. Interface with new option boards would simply require a new memory device to be installed on the host board to reconfigure ECOBI for the new Option board interface. Other possibilities exist (such as downloading a device driver from a communications network) and are all within the scope of the present invention.

The ECOBI host board comprises software running in the CPU 22 in the form of a device manager (ECOBI DM) that performs identification of the Option board at power-on, or when a new Option board is installed or re-initialized. The ECOBI host board also comprises a device driver that is dispatched by the device manager (DM) to initialize the configurable interface circuitry (such as an FPGA) on the host correctly. It initializes the Option board and commences communication between the Option board and the host. The device driver may be resident on the host (as in an EPROM), loaded from a network or external computing device or storage dynamically, or it may even be already present on the Option board and available for loading to the host through the fixed ECOBI ID mechanism.

Optionally, there are several states of the ECOBI Option board interface (and the interface may permit "hot-swapping" of Option boards) which are outlined generally below.

Default state: This is the state of the ECOBI host interface with no Option board installed, or when an Option board is installed but not yet configured, or when the Option board is not recognized by the ECOBI host. In this state, the interface must be completely benign electrically to avoid damage to both the Option board and the host interface. All signals going to the Option board should be either high impedance or in a known electrical state that is defined by the Option board interface specification to be acceptable.

Initialization state: This is the state identified by the process of initializing the ECOBI. The electrical interface may pass through several valid electrical states for initialization purposes, or may be in transitory states as long as they are electrically benign.

Operation state: The state in which the Option board is ready to operate. Option boards do not have to have the same operational state, the same number of active signals, or the same protocol managing the signal activity. What is necessary is that the state of the interface is consistent with the ECOBI device driver and the configuration of the electronic signals on the Option board.

Because the ECOBI is of flexible configuration a large number of Option boards may be developed for products of various functional capabilities. Interface signaling is limited only to the host interface circuitry, the interface may be configured electrically, and the signaling protocol may be any of PCI, VME, STD32, SCSI or many other standard formats. All that is required is that the host electronics be flexible enough to support the electronics across the interface.

The ECOBI and the Option board comprise board identification (ID) circuits, which may be realized in hardware, software or a combination thereof. The ID interface may comprise an I2C bus. This bus is dedicated to providing a means to ID the option board and other Configuration functions as needed. How the host communicates to the option board, and how the host may configure GPIO pins, is determined by the option board ID mechanism.

Option boards may be designed for any number of optional functions that an equipment designer may wish to implement. As long as the option board interface is one that is within the capability of the ECOBI on the host MLB the option board can function within the system. The Option board may have generic design characteristics that make it compatible with the system MLB through the ECOBI interface.

The Option board Interface consists of mechanical, electrical and firmware functions. The goal is to make the Option board interface logic and circuitry as simple as possible to reduce cost and complexity. Implementations may vary regarding what functions are implemented by mechanics, electronics or firmware, but the interface definition comprises the following:

Option Board ID Mechanism
  a. Option Type ID on the Option board (may be mechanical, electrical [preferred] or electro-mechanical).
  b. (Optionally) other configuration information on the Option board which may include the particular option board interface definition or may include a dynamic firmware driver that can be loaded.
  c. Option board ID Controller on the Main Logic Board (can be part of the Central Processing Unit).

Option Interface Configuration Mechanism
  a. Configurable electrical interface circuitry on the Main Logic Board (ECOBI)—this provides a wide range of potential functional interfaces to the Option board, and may consist of CPU and/or FPGA interface circuitry.
  b. (Optionally) Semi-dedicated Electrical Interface Circuitry on the Main Logic Board.
  c. Circuitry to control Interface Power and any critical initialization sequencing—can consist of HW and FW. May optionally include hot-swap and hot-plug control.

Option Board Driver
  a. Option Board Driver consists of Firmware that is constructed to initialize, communicate with and manage the Option Board Function. Part of the initialization process for the driver, if present, is to configure the Configurable Electrical Interface on the Main Logic Board.
  b. (Optionally) as mentioned above, the driver may be dynamically loadable from the Option board via the Option Board ID Mechanism.

Figure 3:
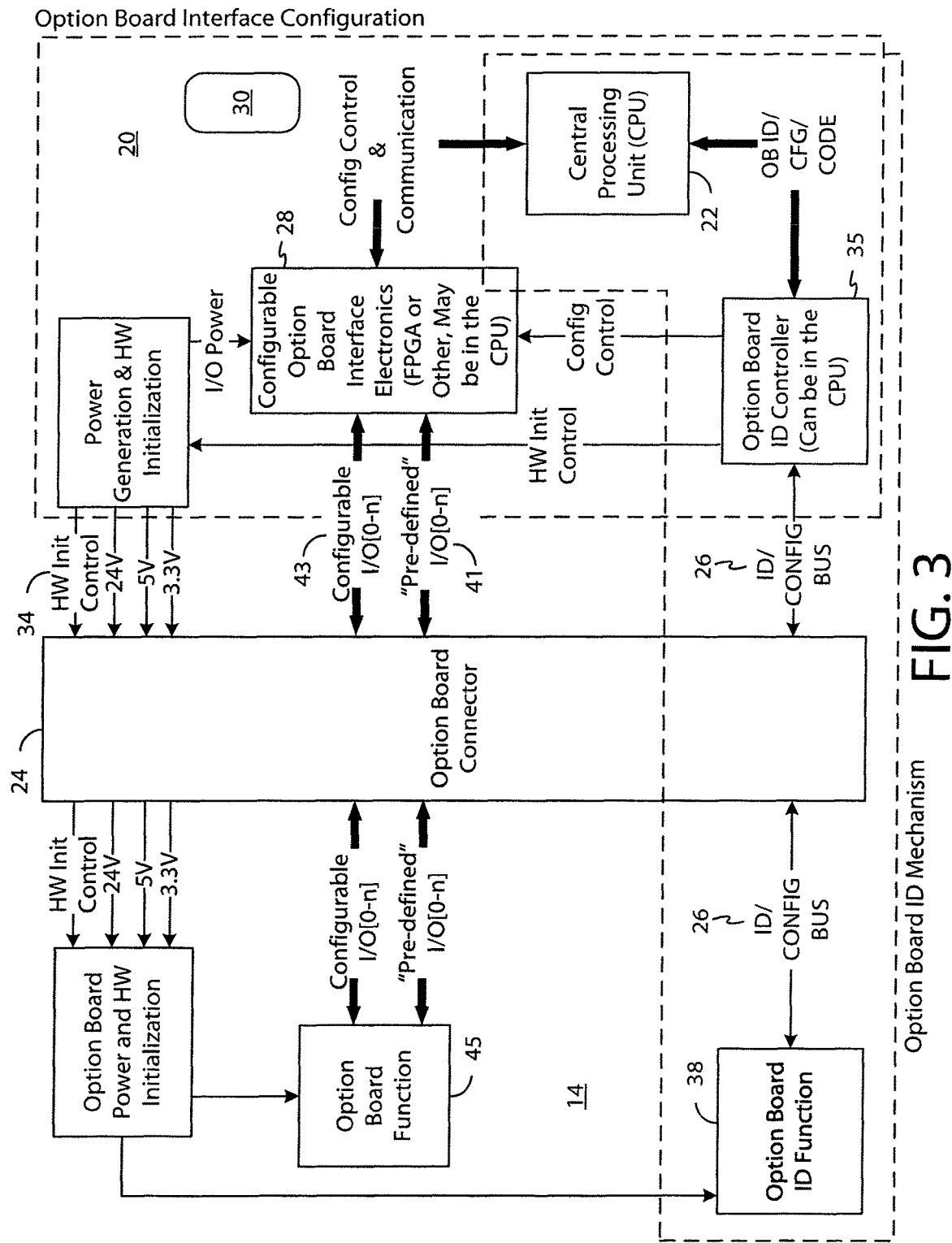
FIG. 3 is block diagram of the assembly of FIG. 2 showing the inter-relationship of the components.

FIG. 3 depicts an example block diagram of the full generic assembly of the host 20 with the ECOBI 28 and an option board 14 configured to operate with it. The host 20 comprises a central processing unit ("processor") 22 which may be dedicated to the ECOBI 28 or may be shared with other functions in a system. The processor 22 is in communication with at least an electrically configurable option board interface (ECOBI) circuitry 28. The configurable interface circuitry may be a device such as a field programmable gate array (FPGA) or may be realized in discrete hardware circuits. The processor 22 is in communication with, or comprises within it, an identification control element 35 that has as a primary input the ID/configuration bus 26. The ID/configuration bus 26 communicates through the interface connector 24 to the ID function 38 on the option board 14. The communications interface between host and option board passes through the connector 24 from the configurable interface circuitry 28 on the host 20 to the option board interface element 45, which may comprise a control processor or an interface buffer. The host/option board interface may comprise pre-defined input/output (I/O) signal lines 41 (if the option board has a standard interface, such as PCI, USB, GPIO) or it may wholly comprise configurable signal lines 43 under the control of the host configurable interface circuitry 28. Power and control signals 34 also pass through the connector 24. A configuration element 30, which may comprise a connector, a ROM, PROM, an EPROM, or EEPROM (or other form of data storage technology), may also be part of the host if the interface configuration is to be either loaded from a memory device or downloaded to the processor 22 through a connector.

The option board interface provides dedicated path, such as an I2C bus 26 with the primary function of communicating to a device on the option board storing option board ID information. Each option board will be associated with a unique option type ID number that the host processor can use to determine the option type, and to determine and configure the communication path (parallel, SDIO, etc.) used for that option. The board ID device might also store other information such as board serial number.

An example of the operation of the Option board ID function follows. The MLB host software/firmware may perform a board discovery/enumeration sequence (similar in function to what is done for PCI) to locate the Option Type ID on the ID/Config bus, which may be at one of several pre-determined ID addresses, and then utilize the ID information to electrically configure the configurable interface circuitry. The MLB software/firmware may perform a table lookup of the Option board ID to establish the proper interface configuration (number of pins used, type of electrical signaling, etc.) or the MLB software/firmware may transfer the configuration information from the Option board over the ID/Config bus. In the latter case the configuration information is stored initially on the Option board and accessed by the host. The MLB software/firmware may be written such that a dynamically loaded driver can be loaded to the host via the ID/Config bus from the Option board.

Figure 4:
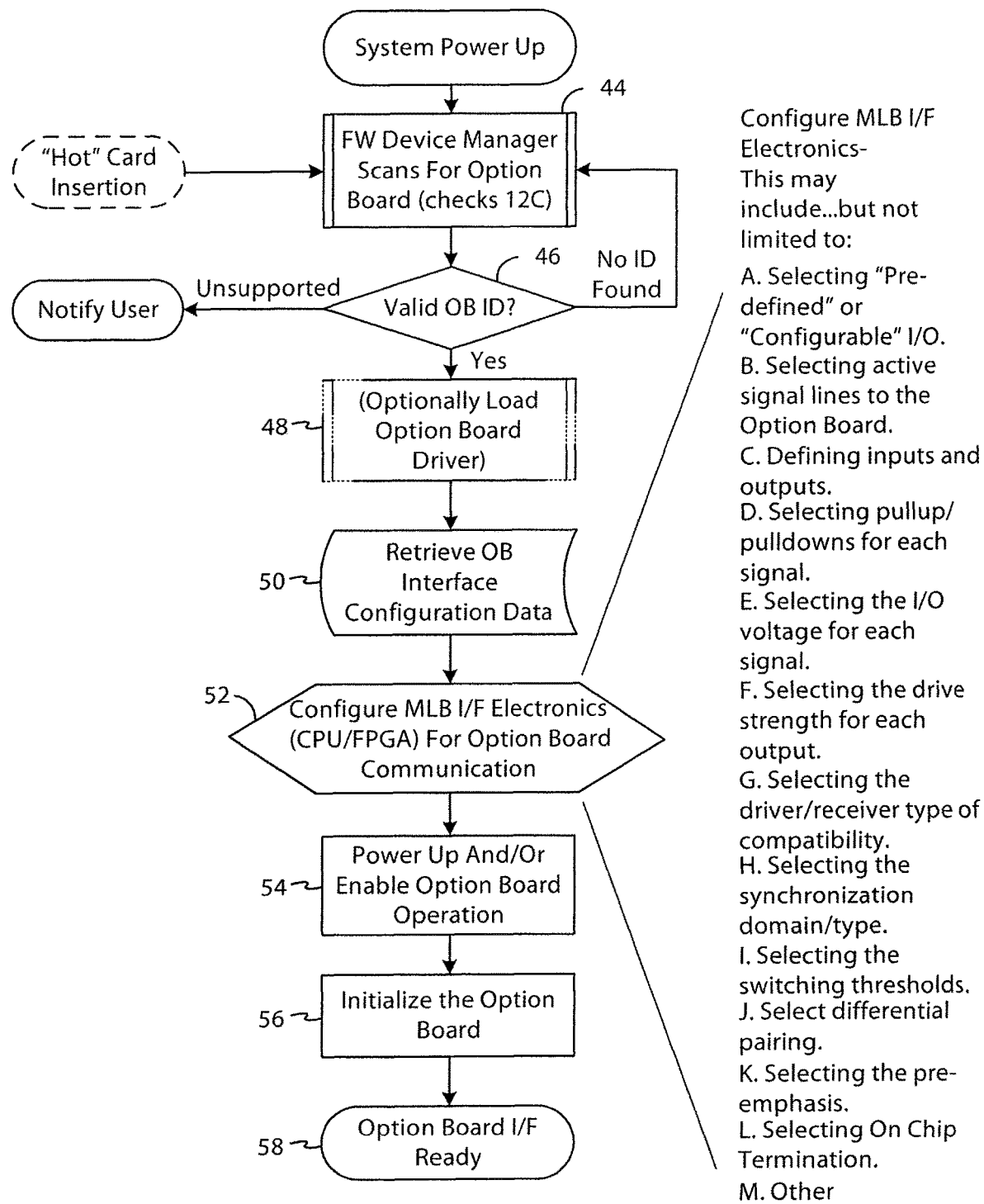
FIG. 4 is a flow diagram of the process of configuring the configurable interface for operation with an option board.

FIG. 4 is a flow diagram illustration of the method sequence in which Option board ID is checked and the ECOBI configured for the interface implemented on the Option board. While Option Type ID is preferably provided by the option to the MLB, Option Board ID information could include any or all data suitable for identifying the option to communicate to the option or to configure the option. After the Option board is connected and the system powered up, software/firmware accesses 44 the Option board ID over the ID interface. A check is performed 46 to ensure that the Option board ID is valid and supported by the host. If not, the user is notified of the failure. If the ID is valid, one of two things can happen. Optionally, if there is an Option board interface driver stored on the Option board, it can be loaded 48 over the ID bus interface into the host processor. The host processor, receiving the driver, would configure the host/option board interface circuitry accordingly. A similar process may occur if the interface driver is loaded from an external processor or communications network, or is accessed directly from a memory device on the host. Otherwise, the Option board ID is used by the processor on the host to retrieve 50 the correct interface configuration for the identified Option board. That interface configuration is then imposed 52 on the configurable interface circuitry. Once the interface is functional the host may proceed to start Option board operation 54 and initialize the Option board 56. At that point the Option board interface is ready 58 to deliver full functionality.

Among the practical configuration functions that may be performed in a configuration sequence are: selecting active signal lines to the option board; defining inputs and outputs in the configured interface; selecting pullups and pulldowns for each signal line to avoid floating signal lines; selecting an input/output voltage for each signal line; selecting a drive strength for each output; selecting the driver/receiver type for compatibility through the interface; selecting a synchronization protocol for the interface configuration; and selecting switching thresholds for the signal lines. These choices are made in the configurable interface CPU and implemented by command control signals to the configurable interface circuitry.

A necessary consideration for interfaces where signals in GHz ranges may cross the interface is line routing and high speed performance. For full electrical flexibility, the GPIO lines may be routed on the MLB to support the highest data rates expected for a printer or other peripheral implementation and connected to a FPGA which can support differential, high-speed operation. For example, some of the GPIO lines may be routed to the FPGA from the connector to support one or more lanes of PCI Express electrical signaling, although the FPGA and signal lines may be re-allocated to other types of electrical interfaces as needed by the Option board ID mechanism. Some implementations of the Option board Interface may electrically support up to 2.5 Gbps maximum over FR-4 type material if proper routing and termination are also utilized for the "GPIO" lines. The Option board Interface embodiment is not necessarily limited to this example, but there are obvious constraints to consider based upon the Main Logic Board routing, material, termination, interface support device(s) (FPGA, etc.) and related characteristics.

Figure 5:
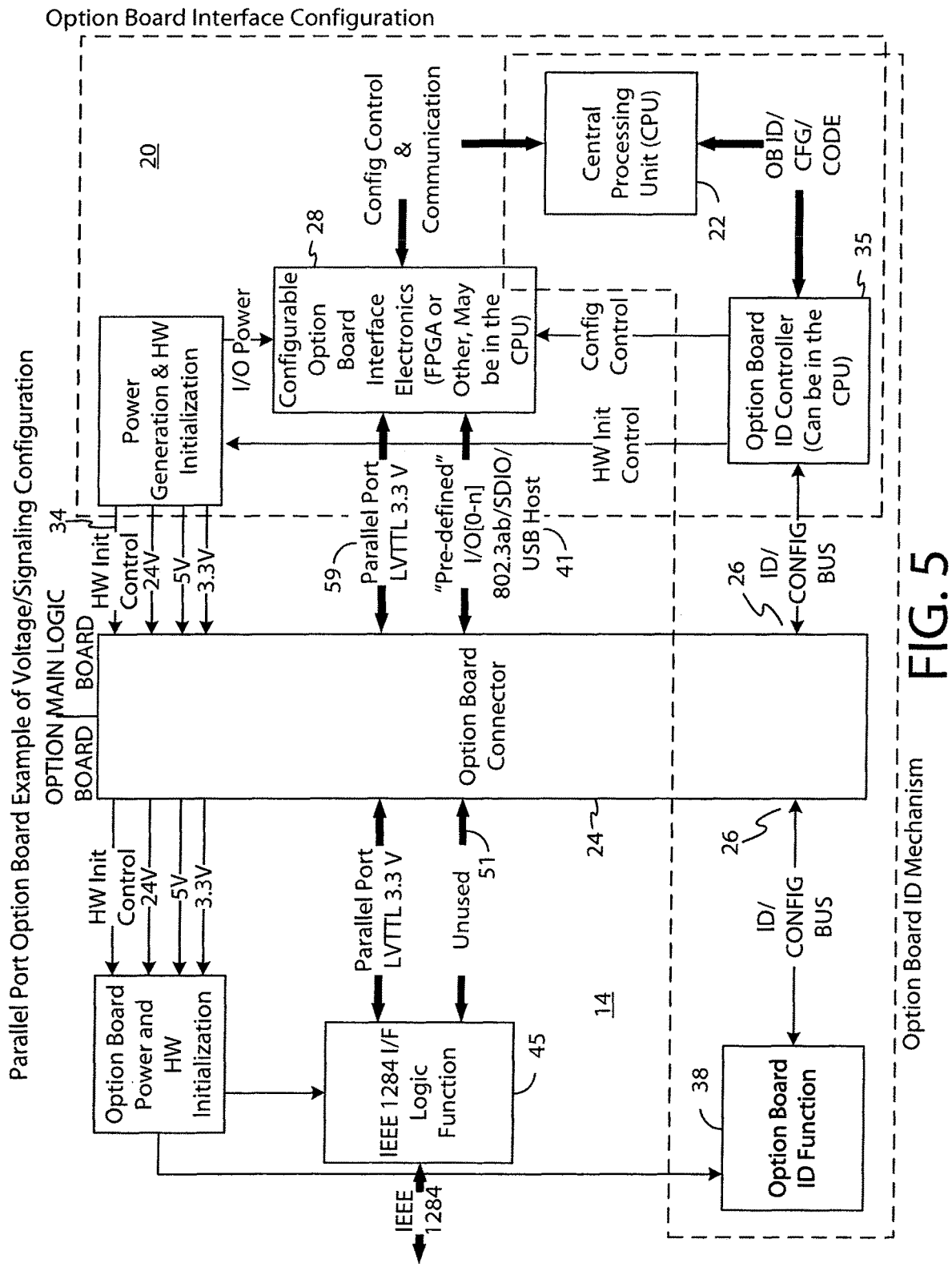
FIG. 5 is block diagram of the electrically configurable interface and option board assembly.
Figure 6:
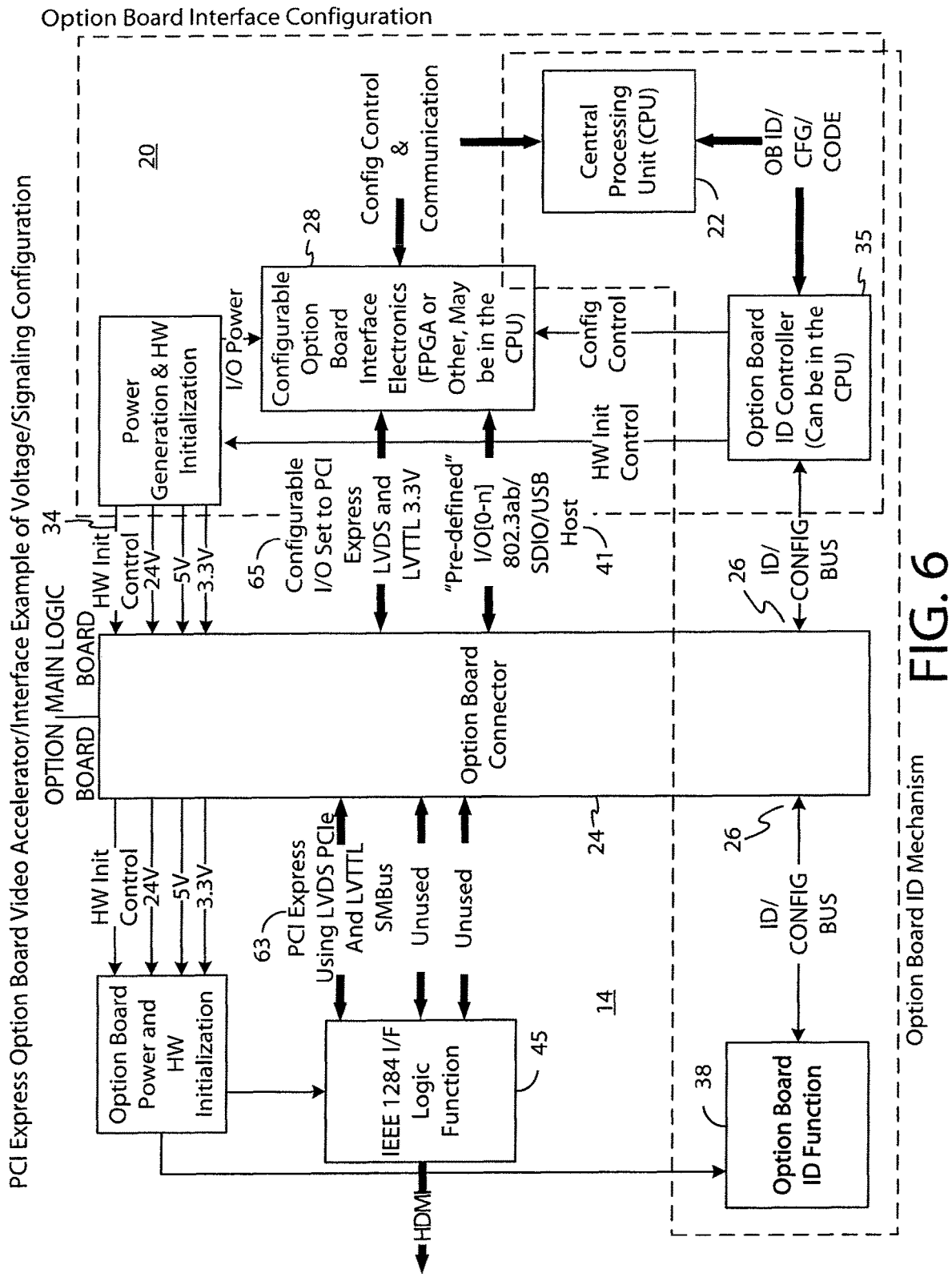
FIG. 6 is block diagram of another embodiment of the electrically configurable interface and option board assembly.

Examples of interface configurations that utilize standard interfaces are shown in FIGS. 5 and 6. FIG. 5 depicts an option board 14 and host main logic board 20 wherein the host 20 has available predefined I/O lines for 802.3ab, SDIO and USB standard interfaces 41. However the Option board shows that those signal lines are unused 51 on the Option board side of the connector 24. The working interface on the Option board side is a Parallel Port low voltage TTL (3.3 V) interface 59. Therefore, the host CPU 22, after acquiring the Option board ID (26, 35), sets up the electrically configurable interface circuitry 28 as a LVTTL 3.3V interface 59 for communication between host 20 and Option board 14.

FIG. 6 shows a similar architectural adjustment by the host 20 where the Option board 14 presents a PCI Express interface 63 using low voltage differential signal (LVDS) PCIe and LVTTL SMBus (system management bus). The host interface circuitry 28 has an available "pre-defined" I/O interface capability 41 that includes 802.3ab, SDIO and USB, but those lines are "unused" on the Option board side of the connector 24. Consequently, the host uses the Option board ID (26, 35) to determine the Option board's interface and configures its electrically configurable interface circuitry 28 to LVDS PCIe and LVTTL 3.3V operation 65 to match the Option board interface requirement.

In order to provide the automated functions on the host, the host comprises at least a processor and a computer readable storage medium for storage of computer coded instructions that implement the method of configuring the Option board interface. Various embodiments described herein are described in the general context of method steps or processes, which may be implemented in one embodiment by a computer program product, embodied in a computer-readable storage medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   detecting a connection of an option board to a host device via an option board interface of the host device, wherein the option board interface includes fixed circuitry corresponding to a standard, and the option board interface includes electrically configurable circuitry;
   determining if the option board is configured to use the fixed circuitry;
   in response to determining that the option board is configured to use the fixed circuitry, using the fixed circuitry for option board communication; and
   in response to determining that the option board is not configured to use the fixed circuitry:
     obtaining, at the host device, option board identification data;
     when the option board identification data is a first value, select a first option board interface configuration based on the first value;
     when the option board identification data is a second value, select a second option board interface configuration based on the second value, wherein the second option board interface configuration is different than the first option board interface configuration;
     and
     configuring the electrically configurable circuitry for option board communication based on the selected one of the first and second option board interface configurations.

2. The method of claim 1, wherein configuring the electrically configurable interface circuitry comprises selecting active signal lines to the option board.

3. The method of claim 1, wherein configuring the electrically configurable circuitry comprises defining inputs and outputs in the electrically configurable circuitry.

4. The method of claim 1, wherein configuring the electrically configurable circuitry comprises selecting pullups and pulldowns for a signal line.

5. The method of claim 1, wherein configuring the electrically configurable circuitry comprises setting a value of an input/output voltage of a signal line.

6. The method of claim 1, wherein configuring the electrically configurable circuitry comprises setting a drive strength of a signal line.

7. The method of claim 1, further comprising selecting a synchronization protocol for the first or second option board interface configuration.

8. The method of claim 1, wherein configuring the electrically configurable circuitry comprises setting a switching threshold of a signal line.

9. The method of claim 1, wherein the option board identification data is received through a dedicated interface bus.

10. The method of claim 1, wherein the electrically configurable circuitry is configured by a driver operating in a processor of the host device.

11. The method of claim 1, wherein obtaining the option board identification data comprises querying the option board for the option board identification data.

12. The method of claim 1, further comprising determining whether the received option board identification data is valid.

13. A non-transitory computer readable storage device having computer coded instructions stored therein that, when executed by a processor, cause an apparatus to:
    detect a connection of an option board to a host device via an option board interface of the host device, wherein the option board interface includes fixed circuitry corresponding to a standard, and the option board interface includes electrically configurable circuitry;
    determine if the option board is configured to use the fixed circuitry;
    in response to determining that the option board is configured to use the fixed circuitry, use the fixed circuitry for option board communication; and
    in response to determining that the option board is not configured to use the fixed circuitry:
      obtain option board identification data;
      when the option board identification data is a first value:
        load a first driver corresponding to a first configuration; and
        configure the electrically configurable circuitry using the first driver; and
      when the option board identification data is a second value different than the first value:
        load a second driver corresponding to a second configuration different than the first configuration; and
        configure the electrically configurable circuitry using the second driver.

14. The computer readable storage device of claim 13, the instructions, when executed, to cause the apparatus to configure the electrically configurable circuitry by selecting active signal lines to the option board.

15. The computer readable storage device of claim 13, the instructions, when executed, to cause the apparatus to configure the electrically configurable circuitry by defining inputs and outputs.

16. The computer readable storage device of claim 13, wherein the option board identification data is received through a dedicated interface bus.

17. The computer readable storage device of claim 13, wherein the first or second driver is received through a dedicated interface bus and the electrically configurable circuitry is configured by the first or second driver operating in the host device.

18. The computer readable storage device of claim 13, the instructions, when executed, to cause the apparatus to obtain the option board identification data by querying the option board for the option board identification data.

19. The computer readable storage device of claim 13, the instructions, when executed, to cause the apparatus to determine whether the obtained option board identification data is valid.

20. An apparatus comprising at least a host logic assembly comprising a processor, memory in communication with the processor having computer coded instructions stored therein, and electrically configurable interface circuitry including a first signal line, the instructions, when executed by the processor, to cause the apparatus to:
  detect a connection of an option board to a host device via an option board interface of the host device, wherein the option board interface includes fixed circuitry corresponding to a standard, and the option board interface includes electrically configurable circuitry;
  determine if the option board is configured to use the fixed circuitry;
  in response to determining that the option board is configured to use the fixed circuitry, use the fixed circuitry for option board communication; and
  in response to determining that the option board is not configured to use the fixed circuitry:
    receive option board identification data corresponding to the option board;
    when the option board identification data is a first value:
      load a first driver; and
      configure the electrically configurable circuitry using the first driver; and
    when the option board identification data is a second value different than the first value:
      load a second driver different than the first value; and
      configure the electrically configurable circuitry using the second driver.

21. The apparatus of claim 20, the instructions, when executed, to cause the apparatus to receive the option board identification data by querying the option board for the option board identification data.

22. The apparatus of claim 20, the instructions, when executed, to cause the apparatus to determine whether the received option board identification data is valid.

23. The apparatus of claim 20, the instructions, when executed, to cause the apparatus to configure the electrically configurable interface after hot-swapping the option board for another option board.

24. The apparatus of claim 20, wherein the option board is to provide the option board identification data through an interface connection to the host device when power is provided.

* * * * *